United States Patent

Engelmann

[11] 4,138,607
[45] Feb. 6, 1979

[54] DUAL PRIORITY TEMPERATURE CONTROL

[75] Inventor: Rudolph H. Engelmann, St. Paul, Minn.

[73] Assignee: Pako Corporation, Minneapolis, Minn.

[21] Appl. No.: 809,845

[22] Filed: Jun. 24, 1977

[51] Int. Cl.² .............................................. H05B 3/02
[52] U.S. Cl. ................................... 219/485; 219/497; 307/41; 307/38; 219/492
[58] Field of Search ............... 219/485, 483, 486, 492, 219/494, 508, 497, 510; 307/37, 38, 39, 41; 340/147 R

[56] References Cited

U.S. PATENT DOCUMENTS

| | | | |
|---|---|---|---|
| 3,426,259 | 2/1969 | Ziehm | 307/41 |
| 3,768,545 | 10/1973 | Wills | 307/39 |
| 3,795,817 | 3/1974 | Chambaut | 307/38 |
| 3,842,243 | 10/1974 | Gregory | 307/41 |

Primary Examiner—Elliot A. Goldberg
Assistant Examiner—M. Paschall
Attorney, Agent, or Firm—Kinney, Lange, Westman and Fairbairn

[57] ABSTRACT

A temperature control system controls operation of two heaters, such as the solution heater and dryer heater of a photographic processor. First and second temperature detectors sense temperature and provide first and second detector signals, which are compared with first and second reference ramp signals by first and second comparators. The comparators produce first and second inhibit signals, which prevent power from being supplied to the first and second heaters, respectively. A priority circuit prevents power from being supplied to the second heater if the first heater is receiving power.

23 Claims, 4 Drawing Figures

DUAL PRIORITY TEMPERATURE CONTROL

BACKGROUND OF THE INVENTION

The present invention relates to control systems for use in systems which supply power to more than one load. In particular, the present invention is a control circuit which provides programmed priority to one of the loads and allows the other load to use the remaining available power.

There are many systems in which power is supplied to more than one high power consuming loads. One example of such a system is a photographic processor, which includes solution tanks for developing photographic film or paper and a dryer for drying the film or paper. Heaters are required to heat the solution used in the solution tanks and to heat air used in the dryer.

REFERENCE TO COPENDING APPLICATION

Reference is made to a copending application by T. Melander entitled "Duty Cycle Shared Proportional Temperature Control", filed on even date with this application and assigned to the same assignee as this application. Subject matter disclosed but not claimed in this application is disclosed and claimed in the copending application.

The invention disclosed and claimed in the Melander application is based upon the recognition that photographic processing is characterized by relatively low heat (energy) demands for the maintenance of processing solution temperatures, and relatively high energy (heat) demands for the drying of the processed material. Because the dryer air has low thermal inertia and the solutions have high thermal inertia, the energy demands to bring the photographic processing system to operating temperature (i.e. warming up) are just the opposite of the energy demands during actual processing of film or paper. Duty cycles for solution heaters are high during warm up and low when the processor is processing. Duty cycles for dryer heaters are low during warm up and high when the processor is processing.

If rapid warm up and adequate drying capabilities are accomplished with conventional control systems, high peak power is demanded when solution and dryer heaters are both on. The Melander control system eliminates these high peak demands. Two time proportioning controls share the same time base. The solution and dryer heaters controlled by these two time proportioning controls are controlled so they cannot be on simultaneously. A priority control gives priority to the solution heater with the dryer heater being allowed to use only that portion not demanded by solution heater. During initial warm up, the solution heater is on 100% of the time. When the solution temperature approaches the set point temperature and the solution heater controller enters its proportional control band, the duty cycle of the solution heater becomes less than 100% making the remainder of the duty cycle available for the dryer heater.

SUMMARY OF THE INVENTION

The present invention is a highly advantageous control circuit which efficiently and effectively provides the control functions proposed in the copending Melander application. The present invention may provide proportional control of two loads, such as a solution heater and dryer heater of a photographic processor, while prioritizing the operation of the two loads.

One successful embodiment of the control circuit of the present invention includes first and second switching means, triggering pulse producing means, first and second detector means, first and second reference signal producing means, first and second inhibit means, and priority means. The power supplied to the first and second loads is controlled by the first and second switching means, which receive first and second triggering pulse signals from the triggering pulse producing means.

The first inhibit means receives signals from the first detector means, and the first reference signal producing means and produces a first inhibit signal. This first inhibit signal inhibits production of the first triggering pulse signals and therefore prevents power from being supplied to the first load. Similarly, the second inhibit means receives signals from the second detector means and second reference signal producing means and produces a second inhibit signal. The second inhibit signal inhibits production of the second triggering pulse signals and therefore prevents power from being supplied to the second load.

The priority means prevents the trigger pulse producing means from producing the second triggering pulses if the first triggering pulses are being produced. This effectively gives the first load priority to power, since the second triggering pulses can only be produced when the first inhibit signal is present and the second inhibit signal is not present.

BRIEF DESCRIPTION OF THE DRAWINGS

FIGS. 1A and 1B are a schematic diagram of one embodiment of the dual priority temperature control of the present invention.

DETAILED DESCRIPTION OF THE PREFERRED EMBODIMENTS

Figure 1B:
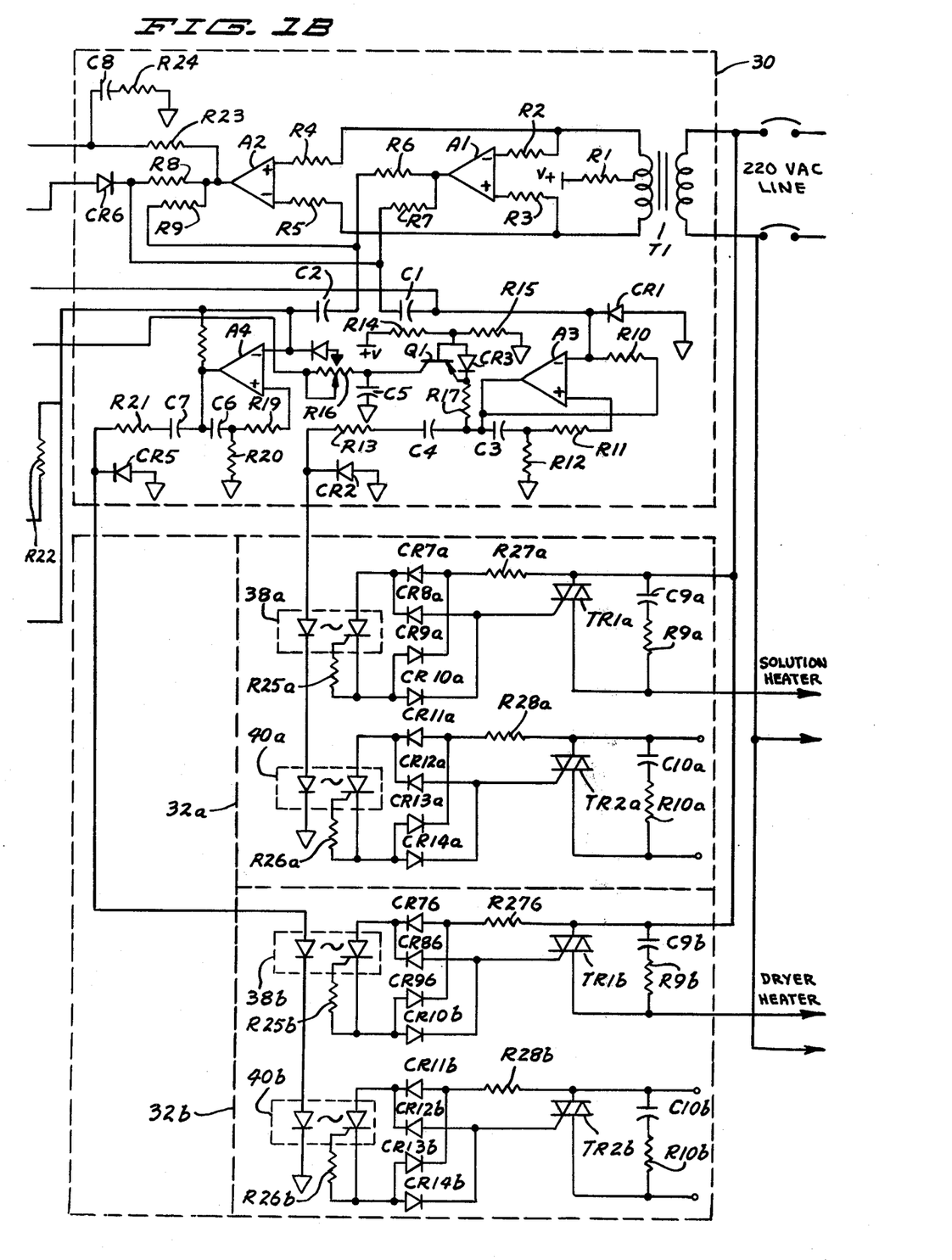

FIGS. 1A and 1B show an electrical schematic diagram of one embodiment of the present invention. The circuit of FIGS. 1A and 1B provides proportional control of two loads such as a solution heater and dyer heater while prioritizing the operation of these loads. In addition, the circuit provides several other advantageous features. First, it is a full wave system with zero cross-over triggering of triacs. The full wave capability assures that no DC components will be present, and the zero cross-over triggering feature reduces electromagnetic interference (EMI). Second, the circuit has been designed so that the triacs may be placed on either side of the load (or on both sides of the load). This is a particularly advantageous feature when three-phase electrical power is being supplied to the loads.

The circuit of FIGS. 1A and 1B includes zero cross-over pulse circuit 30, first and second triac switching circuits 32a and 32b, first and second probe amplifier circuits 34a and 34b, and ramp control 36. First probe amplifier circuit 34a and first triac switching circuit 32a are associated with operation of the solution heater, while second probe amplifier circuit 34b and second triac switching circuit 32b are associated with the operation of the dryer heater.

Zero crossover pulse circuit 30 receives the input AC electrical signal and produces first and second triggering pulses to first and second triac switching circuits 32a and 32b. Whether the triggering pulses are supplied to first triac switching circuit 32a or the second triggering pulses are supplied to second triac switching circuit 32b is determined by first and second probe amplifier circuits 34a and 34b, and ramp control 36.

The input AC signal is received by transformer T1 of zero crossover pulse circuit 30. T1 has a resistor R1 connected at a center tap to the secondary winding of T1. The other terminal of R1 is connected to a positive voltage supply designated as V+. The input signal is applied to two comparator amplifiers A1 and A2. A1 receives the signal through resistors R2 and R3, while A2 receives signals through resistors R4 and R5.

Amplifiers A1 and A2 are connected so that they are 180 out of phase. The outputs of amplifiers A1 and A2, therefore, are out of phase, with one output rising while the other is falling. The outputs are resistor summed by resistors R6-R9. The result is a short pulse which occurs within 50 to 100 mV of each zero crossing of the input signal. The timing of these pulses is very consistent, although the amplitude is somewhat ragged.

The output pulses from the summed outputs of amplifiers A1 and A2 are AC coupled through capacitors C1 and C2 and applied to the inverting iputs of amplifiers A3 and A4. Amplifier A3, together with resistors R10-R17, capacitors C3-C5, diodes CR1-CR3, and transistor Q1 form a circuit which provides the first triggering pulses to first triac switching circuit 32a. Similarly, amplifier A4, resistors R18-R21, capacitors C6 and C7, and diodes CR4 and CR5 form a circuit which provides the second triggering pulses to second triac switching circuit 32b.

Under normal initial operating conditions, amplifier A3 is turned on. A negative going pulse coupled through capacitor C1 disturbs the state of amplifier A3, thereby causing the output of A3 to go positive. The AC feedback of the output through capacitor C3 and resistors R11 and R12 to the noninverting or "+" input of A3 results in positive feedback which drives A3 to the positive rail. The time constant of the AC feedback controls the pulse width of the first triggering pulse produced. The first triggering pulse is AC coupled through C4 and R13 to first triac switching circuit 32a.

Resistors R14-R17, capacitor C5, transistor Q1, and diode CR3 form a feedback circuit which effectively adjusts the set point of the proportional control of the solution heater. The feedback circuit receives, from ramp control 36, the first reference signal which is also supplied to first probe amplifier circuit 34a. The effect of the feedback circuit is to cause A3 to produce a few more first triggering pulses then would ordinarily be produced. The feedback circuit causes these additional pulses to be produced when power demand by the solution heater is on the increase, which may occur, for example, when replenisher fluid is added to the solution tanks. The feedback circuit allows the solution to approach the desired temperature at a faster rate than would otherwise be possible.

The circuit including amplifier A4 operations in a very similar manner. The second triggering pulses produced by A4 are AC coupled through C7 and R21 to second triac switching circuit 32b.

Since the present invention requires that only one load be on at any time, it is essential that only one of the two triac switching circuits 32a and 32b receive triggering pulses from zero crossover pulse circuit 30 at any given time. Amplifier A4 is inhibited from producing the second triggering pulses by the output of second probe amplifier circuit 34b, which is applied through resistor R22 to the inverting input of A4. A4 is inhibited from producing the second triggering pulses when the output signal from second probe amplifier circuit 34b is high, and is permitted to produce the second triggering pulses when the output from second probe amplifier circuit 34b is low.

The inhibit for amplifier A3 is provided by first probe amplifier circuit 34a through diode CR6. When the output of first probe amplifier circuit 34a is low, CR6 is reversed biased and has no effect on the operation of A3. When, on the other hand, the output of first probe amplifier circuit 34a is high, CR6 is forward biased and causes A3 to be swamped, thereby preventing production of the first triggering pulses. As will be described later, the outputs of first and second probe amplifier circuits 34a and 34b are coordinated so that at no time will both the first and the second triggering pulses be produced simultaneously. Either A3 or A4 will be caused to inhibit the production of pulses so that only one load receives power at any given time. In addition, the outputs of the probe amplifier circuits are coordinated so that the first load (the solution heater) controlled by first probe amplifier circuit 34a has complete priority to power during initial warm up and the second load (the dryer heater) is permitted to share power on a duty cycle sharing basis thereafter.

Zero crossover pulse circuit 30 has one additional output signal. This is a clock signal which is provided to ramp control 36. The clock signal is derived from the output of A2 by a coupling circuit including resistors R23 and R24 and capacitor C8.

First and second triac switching circuits 32a and 32b are identical. First triac switching circuit 32a controls application of power to the solution heater, while second triac swithching circuit 32b controls application of power to the dryer heater. The components forming triac switching circuits 32a and 32b are shown with similar designation numbers and letters, except that the elements of the first triac switching circuit 32a are followed by the letter "a", while the elements of second triac switching circuit 32b are followed by the letter "b". For convenience, only first triac switching circuit 32a will be discussed, since the operation of second triac switching circuit 32b is identical.

First triac switching circuit 32a includes optical couplers 38a and 40a, resistors R25a-R30a, diodes CR7a-CR14a, capacitors C9a and C10a, and triacs TR1a and TR2a. The first triggering pulse from amplifier A3 is applied to the light emitting diodes within optical couplers 38a and 40a. The light emitting diodes generate light in response to the first triggering pulse, and this light is detected by the corresponding light activated silicon control rectifier (LASCR) within each optical coupler. This causes the LASCRs to be fired and switched into a conductive state. The switching of the LASCRs triggers triacs TR1a and TR2a. The triacs will remain on until the input power crosses zero, at which time they will turn off. The zero crossover by the input signal, however, causes another pulse to be produced within zero crossover pulse circuit 30. As long as amplifier A3 in zero crossover pulse circuit 30 is not inhibited, first triggering pulses are provided to first triac switching circuit 32a, and power is provided to the solution heater.

First and second triac switching circuits 32a and 32b each include two triacs. This allows a triac to be connected on either side of the load, or on both sides. In FIG. 1B, only TR1a and TR1b are connected to the loads. It can be seen, however, that TR2a and TR2b could also be connected on the opposite side of the load. This may be required for safety in some applications.

First and second probe amplifier circuits 34a and 34b, together with ramp control 36, determine whether the solution heater or the dryer heater will receive the input power. First and second probe amplifier circuits 34a and 34b are essentially identical and, therefore, similar circuit compnents have been designated with similar letters and numbers. The components contained in first probe amplifier circuit 34a include resistors R31a through R45a, amplifiers A5a and A6a, capacitor C11a, zener diode CR15a, and temperature sensitive resistor $R_{THa}$. Similarly second probe amplifier circuit 34b includes resistors R31b through R45b, amplifiers A5b and A6b, capacitor C11b, zener diode CR15b, and temperature sensitive resistor $R_{THb}$. Second probe amplifier circuit 34b also includes two additional components, resistor R46 and diode CR16, which do not have counterparts in first probe amplifier circuit 34a.

Temperature sensitive resistor $R_{THa}$, which is preferably a thermister, is connected in a bridge circuit formed by resistors R31a-R41a. The signal from the bridge circuit are applied to an amplifier circuit including amplifier A5a and resistors R42a and R43a. The output of the amplifier circuit is a first detector signal which is applied to the noninverting input of amplifier A6a. The inverting input to amplifier A6a receives a first reference signal from ramp control 36. The first reference signal from ramp control 36 is a digital stairstep down ramp.

Second probe amplifier circuit 34b is arranged in essentially the same fashion. Temperature responsive resistor $R_{THb}$, which also is preferably a thermister, connected in a bridge circuit including resistors R31b through R41b. An amplifier circuit including amplifier A5b and resistors R42b and R43b receives the output of the bridge and provides a second detector signal to the noninverting input of amplifier A6b. The inverting input of amplifier A6b receives a second reference signal, which is a digital stairstep up ramp signal from ramp control circuit 36.

Ramp control 36 provides the first and second reference signals to first and second probe amplifier circuits 34a and 34b. Ramp control 36 includes counter 38, inverters 40, 42, 44, 46, 48, 50, and 52, field effect transistor FET1-FET12, resistors R47-R63, amplifier A7, Zener diode CR17, and gates 54 and 56.

In the embodiment shown in FIG. 1A, counter 38 is a 7 bit counter. Counter 38 receives clock pulses from the output of amplifier A2 of zero crossover pulse circuit 30. The outputs of counter 38 are connected to inverters 40-52. The outputs of inverters 40, 42, 46, and 48 are connected to the gates of field effect transistors FET1-FET5, respectively. The gate of field effect transistor FET6 is connected to the output of amplifier A7. Field effect transistors FET1-FET6, together with resistors R47-R52, form a digital-to-analog converter which provides the stairstep down ramp first reference signal to the noninverting input of amplifier A6a of first probe amplifier circuit 34a. Resistros R47-R52 have different resistance, with R47 having the highest resistance and R52 the lowest. The values of R47-R52 determine the steps of the stairstep down ramp first reference signal.

Field effect transistors FET7-FET12, together with resistors R53-R58, form a similar digital-to-analog converter which provides the stairstep up ramp second reference signal to the inverting input of amplifier 6b of second probe amplifier circuit 34b. The gates of FET7-FET12 are connected to the six most significant bit outputs of counter 38. Resistor R53 has the highest resistance and R58 has the lowest.

The interconnection of the output of A6a with second probe amplifier circuit 34b provides the required coordination of operation: (1) only one load receives power at any time; (2) the first load (solution heater) gets priority during initial warm up; and (3) the second load (dryer heater) is allowed to share power on a duty cycle sharing basis thereafter. When the output of A6a is low, an offset is applied through diode CR16, resistor R46 and resistor R44b. This offset forces the output of amplifier A6b to remain as long as the output of amplifier A6a is low. As long as the output of A6a remains low, A6a and A3 permit the first triggering pulses to be produced and the solution heater receives power, while A6b and A4 prevent the second triggering pulses from being produced and no power is supplied to the dryer heater.

When the output of A6a goes high, amplifier A3 of zero crossover pulse circuit 30 is inhibited from producing the first triggering pulses. This inhibit is provided through diode CR6, which is forward biased when the A6a output is high.

Amplifier A4 of zero crossover pulse circuit 30 is inhibited when the output of A6b is high. When the output of A6b goes low, amplifier A4 is no longer inhibited from providing the second triggering pulses to second triac switching circuit 32b.

During initial warm up, the solution heater receives power during 100% of each cycle because first reference signal is greater than the first detector signal throughout the entire cycle. The output of A6a, therefore, is low throughout the entire cycle, A3 does not inhibit the first triggering pulses, and the solution heater receives 100% of the available input power. The production of second triggering pulses to second triac switching circuit 32b is inhibited by A6b and A4 since the output of A6a is low (which forces the output of A6b to remain high throughout the entire cycle).

As the solution temperature approaches the desired set point temperature, the operation of the solution heater moves into its proportional control band. The resistance of $R_{THa}$ decreases as the temperature rises and the first detector signal, therefore, increases. The proportional control band is entered when the down ramp first reference signal finally reaches the first detector signal before the end of a cycle. As the first detector signal continues to increase, the first reference signal reaches the first detector signal earlier in each cycle until steady state conditions are attained.

Once the solution heater has entered the proportional band, input power is available for the dryer heater, since A6b is not prevented from going low once A6a has gone high. The dryer heater, therefore, is permitted to receive input power during the remaining portion of each cycle after the output of A6a has gone high.

An optional feature shown in FIGS. 1A and 1B limits the percentage of each duty cycle the solution heater may use once the initial warmup of the solution has been completed and steady state processing operation has begun. For example, the solution may be given absolute priority to input power during warmup and a reduced percentage (for example, 25%) once its duty cycle has decreased to less than that percentage. This assures the dryer heater of at least 75% of the available input power once the initial warmup of the solution has been completed. Ramp control circuit 36 includes an optional circuit formed by amplifier A7, resistors R58-R63 and zener diode CR17 which provides this feature.

Figure 2A:
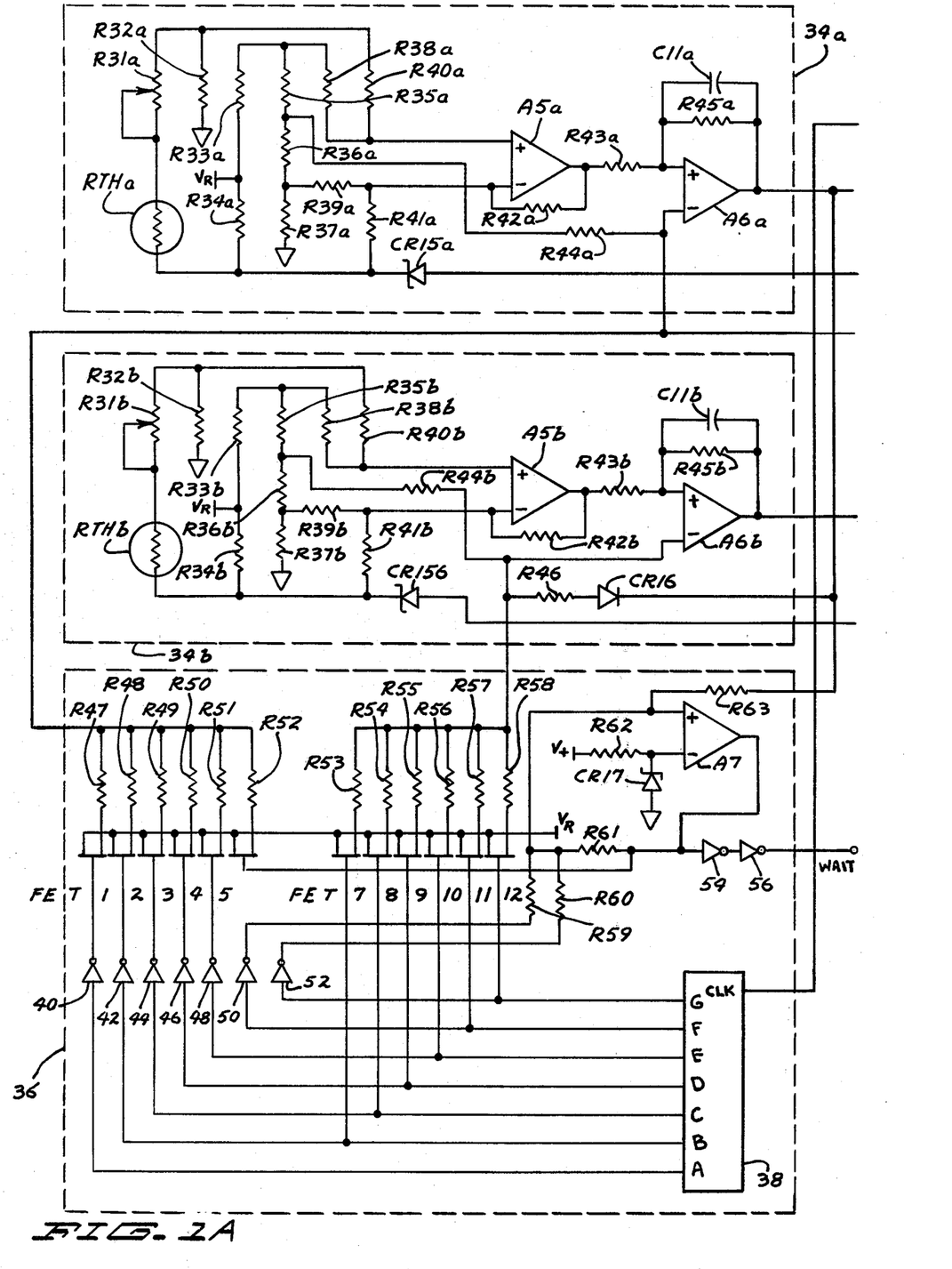
FIGS. 2A and 2B are schematic diagrams of another embodiment of the dual priority temperature control of the present invention.
Figure 2B:
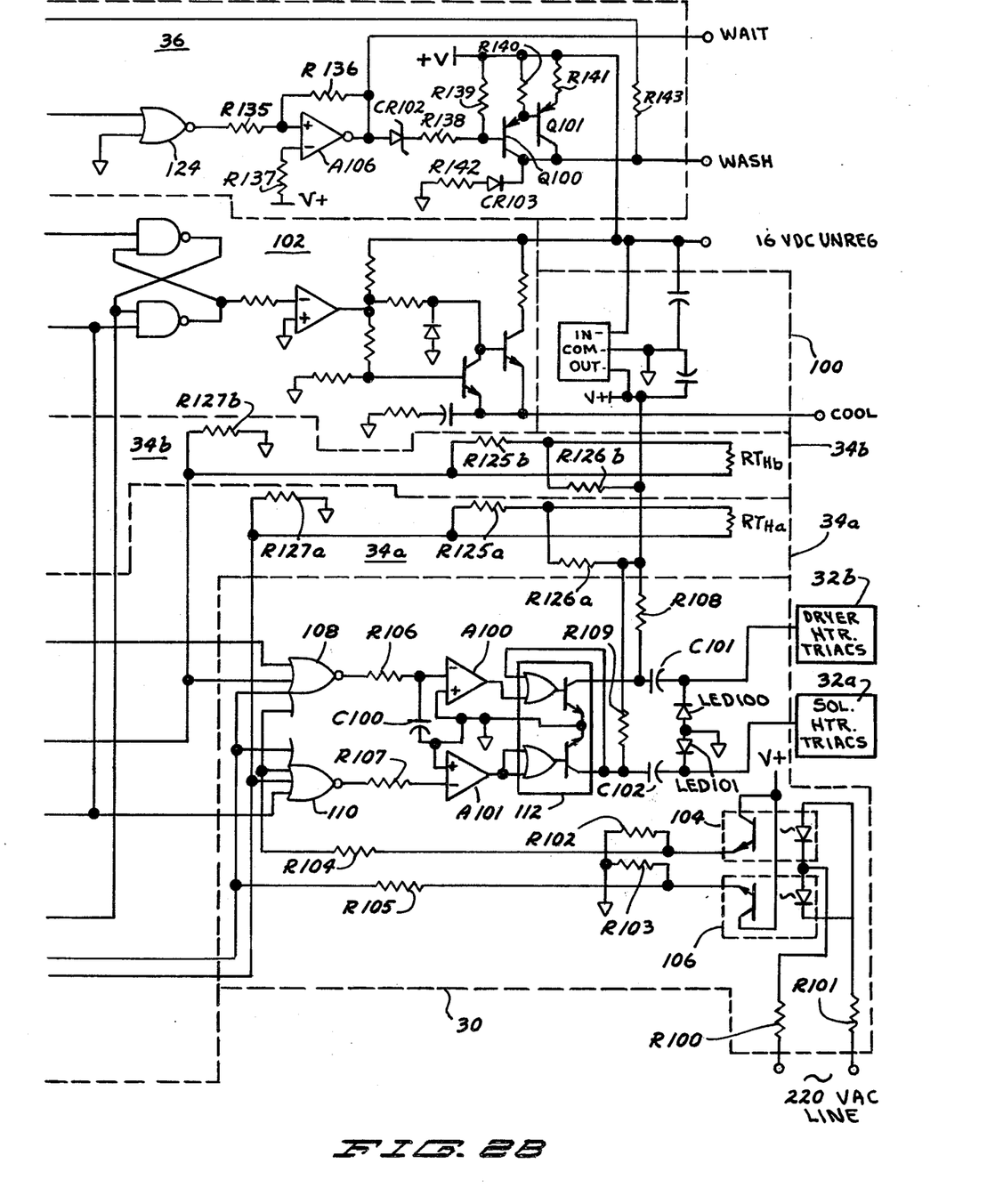

FIGS. 2A and 2B show another embodiment of the dual priority temperature control of the present invention. This embodiment includes the same basic functional blocks, but the functions are performed with somewhat different electronic circuitry from that shown in FIGS. 1A and 1B. Similar numbers have been used to designate the similar functional blocks.

Zero crossover pulse circuit 30 supplies pulses to first and second triac switching circuits 32a and 32b, depending upon the inputs from first and second probe amplifier circuits 34a and 34b. Down and up ramp reference signals are supplied to first and second probe amplifier circuits 34a and 34b, respectively, by ramp generator circuit 36. The $\overline{\text{WAIT}}$ signal is also produced by ramp generator circuit 36.

The control shown in FIGS. 2A and 2B also includes two features not shown in the circuit of FIGS. 1A and 1B. First, the control of FIG. 2 includes a voltage regulator circuit 100, which provides a regulated voltage for use by the logic of the control. Second, the control includes a cooling solenoid control circuit 102 which, under some circumstances activates a solenoid which allows cooling water to be supplied to a heat exchanger. The purpose of circuit 102 is to permit cooling of the solution tanks if the temperature of the solution has exceeded a desired maximum temperature.

In FIG. 2, the input AC voltage is received by resistors R100 and R101, and supplied to optoisolators 104 and 106. The outputs of optoisolators 104 and 106 are connected so that both outputs will be low only at zero crossover. This arrangement eliminates the need for the costly transformer shown in FIG. 1B as well as the various amplifiers required for the production of zero crossover pulses.

The outputs of optoisolators 104 and 106 are supplied through resistors R102-R105 to NOR gates 108 and 110. Depending upon the outputs of probe amplifier circuit 34a and 34b, the output of either NOR gate 108 or NOR gate 110, or both, goes high at zero crossover. The outputs of NOR gates 108 and 110 are connected through resistors R106 and R107, capacitor C100, and amplifiers A100 and A101 to the inputs of buffer driver circuit 112. Buffer driver circuit 112 is preferably a DS3634 integrated circuit.

The outputs of buffer driver circuit 112 are supplied through resistors R108 and R109, capacitor C101 and C102, light emitting diodes LED100 and LED101 to the first triac switching circuit 32a and second triac switching circuit 32b.

One output of buffer driver circuit 112 is fed back to the input so that when a pulse is being supplied to the first triac switching circuit 32a, no pulse may be supplied to second triac switching circuit 32b. The solution heater, therefore, is given priority to power.

The up and down ramp reference signals are supplied by ramp generator 36. Counter 114 counts in response to the output of optoisolator 106, which is supplied through resistors R103, R105, and R110, and capacitor C103, and which corresponds to the zero crossover pulses occurring in a single designated quadrant. Because counter 114 only counts in response to signals from optoisolator 106 (and not to signals from optoisolator 104 as well), "half-cycling" problems are avoided. The outputs of counter 114 are connected through resistors R111-R117 to an input of an amplifying circuit including amplifier A102, resistors R118-R120 and C104. The output of amplifier A102 is the down ramp reference signal which is supplied to first probe amplifier circuit 34a.

The up ramp reference signal, which is supplied to second probe amplifier circuit 34b, is produced by inverting the output of A102. An inverting circuit formed by amplifier A103, resistors A121-R124, and capacitors C105 and C106, receives the output of A102 and generates the up ramp reference signal.

The remaining circuitry of ramp generator 36 produces the $\overline{\text{WAIT}}$ signal and controls the operation of cool solenoid driver circuit 102. In addition, it provides a 25% limit on the solution heater duty cycle once initial warmup has been completed.

First probe amplifier circuit 34a includes solution temperature thermister $R_{THa}$, resistors R125a-R134, capacitors C107a and C108, amplifiers A104a and A105a, and diode CR100. Second probe amplifier circuit 34b contains similar components, including thermister $R_{THb}$, resistors R125b-R131b, capacitor C107b, and amplifiers A104b and A105b.

The output of thermister amplifier A104a is compared with the down ramp reference signal by amplifier A105a. The output of A105a is low so long as the first down ramp reference signal is greater than the output of thermister amplifier A104a. When the output of A105a is low, NOR gate 110 of zero crossover pulse circuit 30 is enabled and triggering pulses are supplied to a first triac switching circuit 32a. Similarly, when the second up ramp reference signal is greater than the output of thermister amplifier A104b, the output of A105b is low and NOR gate 108 is enabled.

As mentioned previously, the priority function in the system of FIG. 2 is provided by the feedback connection of buffer driver circuit 112. When the output of A105a has gone high, the feedback connection of buffer driver circuit 112 no longer disables triggering pulses to second triac switching circuit 32b. When the output of A105b then goes low, triggering pulses are supplied to second triac switching circuit 32b, and power is supplied to the dryer heater.

The priority function in the circuit of FIG. 2, therefore, is achieved in a different manner than the circuit of FIGS. 1A and 1B. In FIGS. 1A and 1B, priority is achieved by causing the second inhibit signal to be present whenever the first inhibit signal is not present. In FIGS. 2A and 2B, on the other hand, the second inhibit signal is not controlled by the presence or absence of the first inhibit signal. Instead, the second triggering pulses are directly prevented by the feedback connection of buffer driver circuit 112 whenever the first triggering pulses are being produced.

As stated previously, a portion of the circuitry of ramp generator 36 provides an optional feature which limits the percentage of each duty cycle the solution heater may use once the warmup of the solution has been completed and steady state processing operation has begun. This circuitry includes NOR gates 120, 122, and 124; NAND gate 126; amplifier A106; transistors Q100 and Q101; diodes CR101-CR103; and resistors R135-R144.

As shown in FIGS. 2A and 2B, the output of NOR gate 120 will be high only during the first 25% of each 128 count operating cycle. If the output of A105a goes high before the output of NOR gate 120 has gone low (i.e. within the first 25% of a cycle), the output of NAND gate 126 will go low. This causes the output of A106 to change state and to remain locked in that state due to the feedback action of resistor R136. The $\overline{\text{WAIT}}$ signal, therefore, goes high and the WASH signal goes low. Once A105a has changed state within the first 25% of any cycle, the $\overline{\text{WAIT}}$ and WASH signals are locked in these states until the machine is turned off. Because the WASH signal is low and is fed back through resistor 143 to NOR gate 122, the changing of state of NOR gate 120 from high to low (which occurs after 25% of each cycle) will cause the output of NOR gate 122 to go high. The output of NOR gate 122 is provided throughf diode CR101 and resistor R144 to the non-inverting input of A105a. When NOR gate 122 goes high, it pulls the non-inverting input of A105a high to insure that the output of A105a goes high, regardless of whether the detector signal would otherwise exceed the down ramp reference signal. In other words, once A105a has changed state within the first 25% of any cycle, in all subsequent cycles A105a will be forced to change state after 25% of the cycle if it has not already done so. This feature, therefore, ensures that the dryer heater will have at least 75% of the available input power once the initial warmup has been completed.

Although the present invention has been described with reference to preferred embodiments, workers skilled in the art will recognize that changes may be made in form and detail without departing from the spirit and scope of the invention. For example, although the specific circuits shown in FIGS. 1A, 1B, and 2A, 2B have many advantages, modifications of the circuits may be made without departing from the operational principles of the circuit. The zero crossover pulse circuit, for example, is a particularly reliable and accurate circuit for providing triggering pulses to the triac switching circuits. Other triggering or crossover pulse circuits, however, may also be utilized. Similarly, alternative probe amplifier circuits may be utilized, particularly in cases where the particular sensor used necessitates different circuitry.

What is claimed is:

1. A control system for controlling the operation of first and second loads, the control system comprising:
    first switching means for preventing power from being applied to the first load when in a first state, and permitting power to be applied to the first load when in a second state, the first switching means switching from the first to the second state in response to a first triggering pulse signal;
    second switching means for preventing power from being applied to the second load when in a first state, and permitting power to be applied to the first load when in a second state, the second switching means switching from the first to the second state in response to a second triggering pulse signal;
    triggering pulse producing means for producing the first and second triggering pulse signals;
    first detector means for providing a first detector signal indicative of a parameter associated with the first load;
    second detector means for providing a second detector signal indicative of a parameter associated with the second load;
    first reference signal producing means for producing a first reference signal;
    second reference signal producing means for producing a second reference signal;
    first inhibit means for providing a first inhibit signal to the triggering pulse producing means to prevent the triggering pulse producing means from producing the first triggering pulse signals when the first detector signal and the first reference signal have a first predetermined relationship;
    second inhibit means for providing a second inhibit signal to the triggering pulse producing means to prevent the triggering pulse producing means from producing the second triggering pulse signal until the second detector signal and the second reference signal attain a second predetermined relationship; and
    priority means for preventing production of the second triggering pulse signal when the first triggering pulse signal is being produced.

2. The control system of claim 1 wherein the priority means comprises:
    means for causing the second inhibit means to produce the second inhibit signal when the first inhibit means is not producing the first inhibit signal.

3. The control system of claim 1 wherein the first and second reference signals are time varying signals.

4. The control system of claim 3 wherein the first and second reference signals comprise first and second ramp signals.

5. The control system of claim 4 wherein the first and second ramp signals have different slopes.

6. The control system of claim 5 wherein first ramp signal is a down ramp and second ramp signal is an up ramp.

7. The control system of claim 6 wherein the first and second inhibit means comprises first and second comparators.

8. The control system of claim 7 wherein the first predetermined relationship is attained when the first detector signal exceeds the first ramp and the second predetermined relationship is attained when the second detector signal is less than the second ramp.

9. The control system of claim 1 wherein the triggering pulse producing means comprises:
    zero crossover sensing means for receiving an AC signal and producing zero crossover pulses in response to zero crossover of the AC signal;
    first triggering pulse producing means for receiving the zero crossover pulses and the first inhibit signal and producing the first triggering pulses in response to the zero crossover pulses when not inhibited by the first inhibit signal; and
    second triggering pulse producing means for receiving the zero crossover pulses and the second inhibit signal and producing the second triggering pulses in response to the zero crossover pulses when not inhibited by the second inhibit signal.

10. The control system of claim 9 wherein the first and second reference signals are first and second ramp signals, respectively.

11. The control system of claim 10 wherein the first and second reference signal producing means comprise:
    counter means for counting in response to the zero crossover pulses occurring in a single designated quadrant;
    first and second ramp producing means for producing the first and second ramp signals from the output of the counter means.

12. A temperature control system for controlling operation of first and second heaters, the system comprising:

first and second control means for controlling input power supplied to the first and second heaters, respectively;

first and second temperature detector means for providing first and second detector signals, respectively;

first and second reference signal producing means for producing first and second reference signals, respectively;

first inhibit means for receiving the first detector signal and first reference signal and supplying a first inhibit signal to the first control means to prevent input power from being supplied to the first heater;

second inhibit means for receiving the second detector signal and second reference signal and supplying a second inhibit signal to the second control means to prevent input power from being supplied to the second heater; and priority means for preventing input power from being supplied to the second heater when input power is being supplied to the first heater.

13. The temperature control system of claim 12 wherein the temperature control system has a plurality of operating cycles and wherein the first inhibit means supplies the first inhibit signal after the first detector signal and first reference signal attain a first predetermined relationship, the fraction of each operating cycle required for the first predetermined relationship to be attained being a function of the first detector signal.

14. The temperature control system of claim 13 wherein the second inhibit means supplies the second inhibit signal during each operating cycle until the second detector signal and second reference signal attain a second predetermined relationship, the fraction of each operating cycle required for the second predetermined relationship to be attained being a function of the second detector signal.

15. The temperature control system of claim 14 wherein the priority means prevents the second detector signal and second reference signal from attaining the second predetermined relationship before the first detector signal and the first reference signal have attained the first predetermined relationship.

16. The temperature control system of claim 15 wherein the priority means further comprises:

means for causing the first detector signal and the first reference signal to attain the first predetermined relationship at least after a predetermined fraction of each operating cycle.

17. The temperature control system of claim 14 wherein the first and second reference signals are first and second ramp signals, respectively.

18. The temperature control system of claim 17 wherein the first ramp signal is an down ramp and the second ramp signal is an up ramp.

19. The temperature control system of claim 18 wherein the first predetermined relationship is attained when the first detector signal exceeds the first ramp signal and the second predetermined relationship is attained when the second detector signal is less than the second ramp signal.

20. The temperature control system of claim 12 wherein the first and second control means comprise:

first switching means for preventing power from being applied to the first heater when in a first state, and permitting power to be applied to the first heater when in a second state, the first switching means switching from the first to the second state in response to a first triggering pulse signal;

second switching means for preventing power from being applied to the second heater when in a first state, and permitting power to be applied to the second heater when in a second state, the second switching means switching from the first to the second state in response to a second triggering pulse signal; and triggering pulse producing means for producing the first and second triggering pulse signals.

21. The temperature control system of claim 20 wherein the first and second inhibit signals inhibit the triggering pulse producing means from producing the first and second triggering pulse signals, respectively.

22. The temperature control system of claim 21 wherein the triggering pulse producing means comprises;

zero crossover sensing means for receiving an AC signal and producing zero crossover pulses in response to zero crossover of the AC signal;

first triggering pulse producing means for receiving the zero crossover pulses and the frist inhibit signal and producing the first triggering pulses in response to the zero crossover pulses when not inhibited by the first inhibit signal; and second triggering pulse producing means for receiving the zero crossover pulses and the second inhibit signal and producing the second triggering pulses when not inhibited by the second inhibit signal.

23. The temperature control system of claim 20 wherein the first and second switching means comprise first and second triac switching circuits, respectively.

* * * * *